US009866379B2

(12) United States Patent
Nordholt et al.

(10) Patent No.: US 9,866,379 B2
(45) Date of Patent: Jan. 9, 2018

(54) POLARIZATION TRACKING SYSTEM FOR FREE-SPACE OPTICAL COMMUNICATION, INCLUDING QUANTUM COMMUNICATION

(75) Inventors: Jane Elizabeth Nordholt, Los Alamos, NM (US); Raymond Thorson Newell, Santa Fe, NM (US); Charles Glen Peterson, Los Alamos, NM (US); Richard John Hughes, Los Alamos, NM (US)

(73) Assignee: Los Alamos National Security, LLC, Los Alamos, NM (US)

( * ) Notice: Subject to any disclaimer, the term of this patent is extended or adjusted under 35 U.S.C. 154(b) by 13 days.

(21) Appl. No.: 13/600,918

(22) Filed: Aug. 31, 2012

(65) Prior Publication Data
US 2013/0083925 A1  Apr. 4, 2013

Related U.S. Application Data

(60) Provisional application No. 61/541,679, filed on Sep. 30, 2011.

(51) Int. Cl.
*H04K 1/00* (2006.01)
*H04L 9/08* (2006.01)
*H04B 10/70* (2013.01)

(52) U.S. Cl.
CPC .......... *H04L 9/0858* (2013.01); *H04B 10/70* (2013.01)

(58) Field of Classification Search
None
See application file for complete search history.

(56) References Cited

U.S. PATENT DOCUMENTS

| 5,966,224 A | 10/1999 | Hughes et al. |
| 6,263,435 B1 | 7/2001 | Dondeti et al. |
| 6,289,104 B1 * | 9/2001 | Patterson ............ H04L 9/0858 380/256 |
| 6,445,453 B1 * | 9/2002 | Hill .................... G02B 21/0068 356/450 |
| 6,748,081 B1 * | 6/2004 | Dultz et al. .................. 380/277 |
| 6,748,083 B2 | 6/2004 | Hughes et al. |

(Continued)

FOREIGN PATENT DOCUMENTS

| CN | 101572600 A | 11/2009 |
| CN | 101599826 | 12/2009 |

(Continued)

OTHER PUBLICATIONS

Wong, F.N.C. et al., "Efficient Generation of Polarization-Entangled Photons in Nonlinear Crystal", ISSN 1054-660X, Laser Physics, 2006, vol. 16, No. 11, pp. 1517-1524.*

(Continued)

*Primary Examiner* — Techane Gergiso (57) ABSTRACT

Quantum communication transmitters include beacon lasers that transmit a beacon optical signal in a predetermined state of polarization such as one of the states of polarization of a quantum communication basis. Changes in the beacon polarization are detected at a receiver, and a retarder is adjusted so that the states of polarization in a received quantum communication optical signal are matched to basis polarizations. The beacon and QC signals can be at different wavelengths so that the beacon does not interfere with detection and decoding of the QC optical signal.

26 Claims, 4 Drawing Sheets

(56) References Cited

U.S. PATENT DOCUMENTS

| | | | |
|---|---|---|---|
| 7,515,716 B1* | 4/2009 | Elliott | 380/256 |
| 7,574,137 B1* | 8/2009 | Lekki | H04B 10/70 398/163 |
| 7,587,654 B2 | 9/2009 | Matsumoto | |
| 7,627,126 B1 | 12/2009 | Pikalo et al. | |
| 7,725,026 B2 | 5/2010 | Patel et al. | |
| 8,005,227 B1 | 8/2011 | Linnell et al. | |
| 8,213,620 B1 | 7/2012 | Sussland et al. | |
| 8,994,920 B1* | 3/2015 | Johnson | G03F 7/7015 355/55 |
| 2001/0055389 A1 | 12/2001 | Hughes et al. | |
| 2002/0010857 A1 | 1/2002 | Karthik | |
| 2002/0131139 A1* | 9/2002 | Mandella | A61B 1/00183 359/214.1 |
| 2003/0002768 A1 | 1/2003 | Wood et al. | |
| 2003/0098355 A1 | 5/2003 | Johnson | |
| 2004/0017916 A1 | 1/2004 | Staddon et al. | |
| 2004/0114152 A1* | 6/2004 | Hill | G03F 7/70716 356/498 |
| 2004/0128509 A1 | 7/2004 | Gehrmann | |
| 2005/0036624 A1 | 2/2005 | Kent et al. | |
| 2005/0044356 A1 | 2/2005 | Srivastava et al. | |
| 2005/0083580 A1* | 4/2005 | Hendriks | G02B 3/04 359/642 |
| 2005/0135620 A1 | 6/2005 | Kastella et al. | |
| 2005/0141716 A1 | 6/2005 | Kumar | |
| 2005/0238356 A1* | 10/2005 | Gilbert | H04B 10/1121 398/118 |
| 2006/0007531 A1* | 1/2006 | Korengut | G01N 21/8806 359/362 |
| 2006/0056630 A1 | 3/2006 | Zimmer et al. | |
| 2006/0088157 A1 | 4/2006 | Fujii | |
| 2006/0168446 A1 | 7/2006 | Ahonen et al. | |
| 2006/0212936 A1 | 9/2006 | Berzanskis et al. | |
| 2006/0222180 A1 | 10/2006 | Elliott | |
| 2006/0263096 A1 | 11/2006 | Dinu et al. | |
| 2006/0290941 A1* | 12/2006 | Kesler et al. | 356/491 |
| 2007/0058310 A1 | 3/2007 | Tanaka et al. | |
| 2007/0177735 A1 | 8/2007 | Mimih et al. | |
| 2007/0192598 A1 | 8/2007 | Troxel et al. | |
| 2007/0211786 A1 | 9/2007 | Shattil | |
| 2007/0223698 A1 | 9/2007 | Tsurumaru | |
| 2007/0280689 A1 | 12/2007 | Boffi et al. | |
| 2008/0031456 A1 | 2/2008 | Harrison et al. | |
| 2008/0144823 A1 | 6/2008 | Abe et al. | |
| 2008/0152147 A1 | 6/2008 | Xia et al. | |
| 2008/0310856 A1 | 12/2008 | Poppe | |
| 2009/0022322 A1 | 1/2009 | Trifonov | |
| 2009/0092252 A1 | 4/2009 | Noll et al. | |
| 2009/0110033 A1 | 4/2009 | Shattil | |
| 2009/0150561 A1 | 6/2009 | Vig | |
| 2009/0160670 A1 | 6/2009 | Sipple | |
| 2009/0169015 A1 | 7/2009 | Watanabe | |
| 2009/0175450 A1 | 7/2009 | Brandt | |
| 2009/0175452 A1 | 7/2009 | Gelfond et al. | |
| 2009/0180615 A1 | 7/2009 | Trifonov | |
| 2009/0180616 A1 | 7/2009 | Brodsky et al. | |
| 2009/0180776 A1 | 7/2009 | Brodsky et al. | |
| 2009/0185689 A1 | 7/2009 | Beal | |
| 2009/0190759 A1 | 7/2009 | Peev et al. | |
| 2009/0202074 A1 | 8/2009 | Trifonov et al. | |
| 2009/0240913 A1 | 9/2009 | Obana et al. | |
| 2009/0257755 A1 | 10/2009 | Buelow | |
| 2009/0262942 A1 | 10/2009 | Maeda et al. | |
| 2009/0292168 A1* | 11/2009 | Farr | A61B 1/0607 600/109 |
| 2010/0028024 A1 | 2/2010 | Shpantzer et al. | |
| 2010/0158252 A1* | 6/2010 | Youn et al. | 380/256 |
| 2010/0211787 A1 | 8/2010 | Bukshpun et al. | |
| 2010/0226659 A1 | 9/2010 | Nishioka et al. | |
| 2010/0257434 A1 | 10/2010 | Harrison et al. | |
| 2011/0140000 A1* | 6/2011 | Iketaki | G02B 21/0068 250/458.1 |
| 2011/0208971 A1 | 8/2011 | Bhattacharya et al. | |
| 2011/0213979 A1 | 9/2011 | Wiseman et al. | |
| 2011/0280405 A1* | 11/2011 | Habif | H04B 10/70 380/278 |
| 2012/0087500 A1* | 4/2012 | Ukita | H04B 10/70 380/256 |
| 2012/0177201 A1* | 7/2012 | Ayling et al. | 380/278 |

FOREIGN PATENT DOCUMENTS

| | | |
|---|---|---|
| EP | 2081317 | 7/2009 |
| KR | 10-0892763 | 4/2009 |
| WO | WO 2007/123869 | 11/2007 |
| WO | WO 2008/015758 | 2/2008 |
| WO | WO 2009/093034 | 7/2009 |
| WO | WO 2009/093036 | 7/2009 |
| WO | WO 2009/093037 | 7/2009 |
| WO | WO 2009/141586 | 11/2009 |
| WO | WO 2009/141587 | 11/2009 |
| WO | WO 2009/145392 | 12/2009 |
| WO | WO-2012039595 A1 | 3/2012 |
| WO | WO 2012/044852 | 4/2012 |
| WO | WO 2012/044855 | 4/2012 |
| WO | WO 2013/048671 | 4/2013 |
| WO | WO 2013/048672 | 4/2013 |
| WO | WO 2013/048674 | 4/2013 |

OTHER PUBLICATIONS

Nordholt, Jane E., et al., "Present and future free-space quantum key distribution", High-Power Lasers and Applications (pp. 115-126), International Society for Optics and Photonics, 2002.*

Ma, Jing, et al., "Theoretical study of polarization tracking in satellite quantum key distribution", arXiv preprint quant-ph/0504077, 2005.*

AFP-JIJI Press, "Japanese Develop System to Prevent Mobile Phone Tapping," *JIJI Press*, 4 pp., downloaded from the World Wide Web (document marked Sep. 2, 2010).

Arda, "A Quantum Information Science and Technology Roadmap—Part 2: Quantum Cryptography—Report of the Quantum Cryptography Technology Experts Panel," 100 pp. (Jul. 19, 2004).

Barrie, "Defeating Cyber-Attacks with Quantum Cryptography," *FoxNews.com,* 2 pp. (Mar. 2013).

Becker et al., "Merkle Signature Schemes, Merkle Trees and Their Cryptanalysis," 28 pp. (2008).

Buttler et al., "Free-space Quantum Key Distribution," *Phys. Rev. A*, vol. 57, Issue 4, pp. 2379-2382 (Apr. 1998).

Buttler et al., "Practical Free-space Quantum Key Distribution over 1 km," Physical Review Letters, vol. 81, No. 15, pp. 3283-3286 (Oct. 1998).

Chapuran et al., "Optical Networking for Quantum Key Distribution and Quantum Communications," *New Journal of Physics*, vol. 11, 19 pp. (Oct. 2009).

Damgård et al., "Secure Identification and QKD in the Bounded-Quantum-Storage Model," *Proc. 27th Annual Int'l Cryptology Conf. on Advances in Cryptology*, pp. 342-359 (Aug. 2007).

Duligall et al., "Low Cost and Compact Quantum Key Distribution," *New Journal of Physics*, vol. 8, 16 pp. (Oct. 2006).

Federal Information Processing Standard Publication 197, "The Advanced Encryption Standard (AES)," 51 pp. (Nov. 2001).

Federal Information Processing Standard Publication 198, "The Keyed-Hash Message Authentication Code (HMAC)," 20 pp. (Mar. 2002).

Graham-Rowe, "My Name Is Bob and I Make E-shopping a Cinch," *New Scientist*, pp. 30-31 (Nov. 2007).

Greenemeier, "Quantum Cryptography Comes to Smart Phones," *Scientific American*, 1 p. (Feb. 2012).

Harrington et al, "Enhancing Practical Security of Quantum Key Distribution with a Few Decoy States," 4 pp. (Mar. 2005).

Hillery et al., "Quantum Secret Sharing," *Physical Review A*, vol. 59, No. 3, pp. 1829-1834 (Mar. 1999).

Hughes et al, "Comment on 'Quantum Key Distribution with 1.25 Gbps Clock Synchronization' by J. C. Bienfang et al., quant-ph/0405097," 4 pp. (Jul. 2004).

(56) References Cited

OTHER PUBLICATIONS

Hughes et al., "Free-space Quantum Key Distribution in Daylight," *Journal of Modern Optics*, vol. 47, Issues 2-3, pp. 549-562 (Feb. 2000).
Hughes et al., "Network-Centric Quantum Communications with Application to Critical Infrastructure Protection," LA-UR-13-22718 (version 2), 7 pp. (May 2013).
Hughes et al., "Practical Free-Space Quantum Cryptography," 17 pp. (1998).
Hughes et al., "Practical Free-space Quantum Key Distribution over 10 km in Daylight and at Night," *New Journal of Physics*, vol. 4, pp. 43.1-43.14 (Jul. 2002).
Hughes et al, "Practical Quantum Cryptography for Secure Free-space Communications," 12 pp. (May 1999).
Hughes et al., "Quantum Cryptography over Underground Optical Fibers," *Advances in Cryptology*, 16 pp. (Jul. 1996).
Hughes et al., "Quantum Key Distribution," Los Alamos National Laboratory Physics Division, pp. 193-196 (Apr. 2004).
Hughes et al., "Practical Quantum Key Distribution over a 48-km Optical Fiber Network," LA-UR-99-1593, 13 pp. (1999).
Hughes et al, "Secure Communications Using Quantum Cryptography," *Proc. SPIE Photonic Quantum Computing*, vol. 3076, pp. 2-11 (Jul. 1997).
ID Quantique SA, "CLAVIS2 Quantum Key Distribution for R&D Applications," 2 pp. (downloaded from the World Wide Web on Sep. 9, 2011).
ID Quantique SA, "Redefining Precision CLAVIS2: The Most Versatile Quantum Key Distribution Research Platform," 4 pp. (document marked Jan. 2010).
ID Quantique SA, "Redefining Security CERBERIS the Best of Classical and Quantum Worlds: Layer 2 Link Encryption with Quantum Key Distribution," 2 pp. (document marked Jan. 2010).
ID Quantique SA, "Separation of Duties: Dedicated vs Integrated Encryption Appliances," White Paper, Version 1.0, 8 pp. (Feb. 2011).
International Search Report dated Dec. 7, 2012, from International Patent Application No. PCT/US2012/053378, 2 pp.
Kunz-Jacques et al., "Using Hash-Based Signatures to Bootstrap Quantum Key Distribution," 9 pp. (Sep. 2011).
Los Alamos National Laboratory, "Quantum Smart Card—QKarD," 1 p.
Ma et al., "High Speed Quantum Key Distribution Over Optical Fiber Network System," Journal of Research of NIST, vol. 114, No. 3, 29 pp. (May-Jun. 2009).
MagiQ Technologies, Inc., "MAGIQ QPNTM 8505 Security Gateway Uncompromising VPN SecurityTM," 4 pp. (document marked 2007).
Menendez et al., "Network Applications of Cascaded Passive Code Translation for WDM-compatible Spectrally Phase-encoded Optical CDMA," Journal of Lightwave Technology, vol. 23, No. 10, 13 pp. (2005).
Menezes et al, "Handbook of Applied Cryptography," Table of Contents and Chapters 11-13, 177 pp. (1997).
Mink, "Custom Hardware to Eliminate Bottlenecks in QKD Throughput Performance," *Proc. SPIE*, vol. 6780, 6 pp. (Sep. 2007).
MIT Technology Review, "Government Lab Reveals It Has Operated Quantum Internet for Over Two Years," 10 pp. (May 6, 2013).
Mitsubishi Electric Corporation, "Mitsubishi Electric Advance: Cryptography Edition," vol. 100, 29 pp. (Dec. 2002).
Mitsubishi Electric Corporation, "Mitsubishi Electric Advance: Information Security Technology," vol. 126, 27 pp. (Jun. 2009).
Mitsubishi Electric Corporation Press Release, "Mitsubishi, NEC, Tokyo University Realize Successful Interconnection of Quantum Encryption Networks for First Time in Japan," 4 pp. (document marked May 12, 2006).
Mitsubishi Electric, "One-time Pad Mobile Phone Software," 1 pp. (Oct. 2010).
National Institute of Information and Communications Technology Press Release, "Inauguration of the Tokyo QKD Network," 3 pp. (document marked Oct. 14, 2010).
Nordholt et al., "A New Face for Cryptography," Los Alamos Science, No. 27, pp. 68-85 (2002).
Nordholt et al., "Present and Future Free-space Quantum Key Distribution," *Proc. SPIE Free-Space Laser Communication Technologies XIV*, vol. 4635, pp. 116-126 (Apr. 2002).
Peev et al., "The SECOQC Quantum Key Distribution Network in Vienna," *New Journal of Physics*, vol. 11, 37 pp. (Jul. 2009).
Peters et al., "Dense Wavelength Multiplexing of 1550 nm QKD with Strong Classical Channels in Reconfigurable Networking Environments," *New Journal of Physics*, vol. 11, 17 pp. (Apr. 2009).
Quintessence Labs Pty Ltd., "Breakthrough Technology," "Optical Subsystem Module/Card," "Modules of Operation," and "Application Areas," 5 pp. (documents downloaded from the World Wide Web on Sep. 9, 2011).
Rass et al, "Quantum Coin-Flipping-Based Authentication," IEEE, 5 pp. (Jun. 2009).
Rosenberg et al., "Long-Distance Decoy-State Quantum Key Distribution in Optical Fiber," *Physical Review Letters*, vol. 98, 4 pp. (Jan. 2007).
Rosenberg et al., "Practical Long-distance Quantum Key Distribution System Using Decoy Levels" *New Journal of Physics*, vol. 11, 10 pp. (Apr. 2009).
Rosenberg et al., "Quantum Key Distribution at Telecom Wavelengths with Noise-free Detectors," 8 pp. (also published as Rosenberg et al., "Quantum Key Distribution at Telecom Wavelengths with Noise-free Detectors," *IEEE Applied Physics Letters*, vol. 88, Issue 2, pp. 21108-1-21108-3 (Jan. 2006)).
Runser et al., "Progress Toward Quantum Communications Networks: Opportunities and Challenges," *Optoelectronic Integrated Circuits IX*, vol. 6476, 15 pp. (Mar. 2007).
Schneider, "A Critical Look at Wireless Power," *IEEE Spectrum*, 10 pp. (May 2010).
SECOQC, "SECOQC White Paper on Quantum Key Distribution and Cryptography," Secoqc-WP-v5, 28 pp. (Jan. 22, 2007).
Shih et al., "New Efficient Three-Party Quantum Key Distribution Protocols," *IEEE Journal of Selected Topics in Quantum Electronics*, 15:6 pp. 1602-1606 (Nov./Dec. 2009).
Toliver et al., "Demonstration of 1550 nm QKD with ROADM-based DWDM Networking and the Impact of Fiber FWM" *Conf. on Lasers and Electro-Optics*, 2 pp. (May 2007).
Toliver et al., "Experimental Investigation of Quantum Key Distribution Through Transparent Optical Switch Elements," *IEEE Photonics Technology Letters*, vol. 15, Issue 11, pp. 1669-1671 (Nov. 2003).
Troiani, "Los Alamos Lab Uses Quantum Physics for Mobile Security," 2 pp., downloaded from http://www.thenewnewinternet.com/2012/01/26/los-alamos-lab-uses-quantum-physics-for-mobile-security/ (Jan. 26, 2012).
Vittorio, "Quantum Cryptography: Privacy Through Uncertainty," ProQuest, 9 pp. (Oct. 2002).
Wegman et al., "New Hash Functions and Their Use in Authentication and Set Equality" *Journal of Computer and System Sciences*, vol. 22, Issue 3, pp. 265-279 (Jun. 1981).
Wikipedia, "Quantum Cryptography," 10 pp. (2010).
Wikipedia, "Key Distribution," 5 pp. (2010).
Wikipedia, "One-time Pad," 12 pp. (2010).
Written Opinion dated Dec. 7, 2012, from International Patent Application No. PCT/US2012/053378, 6 pp.
Yao, "Polarization in Fiber Systems: Squeezing out More Bandwidth," The Photonics Handbook, 5 pp. (2003).
Alleaume et al., "SECOQC White Paper on Quantum Key Distribution and Cryptography," *SECOQC*, 28 pages (Jan. 2007).
Biham et al., "Quantum Cryptographic Network Based on Quantum Memories," Physical Review A, vol. 54, No. 4, 8 pages (1996).
Extended European Search Report for European Patent Application No. 13837039.0 dated Mar. 30, 2016 (11 pages).
Huang et al., "Quantum Key Distribution Based on Multi-Qubit Hadamard Matrices," 2008 The Fourth International Conference on Information Assurance and Security, pp. 333-337 (2008).
International Search Report and Written Opinion for International Patent Application No. PCT/US2013/055356, dated May 5, 2014 (7 pages).

(56) References Cited

OTHER PUBLICATIONS

International Search Report for PCT/US2013/055430 dated Jun. 5, 2014 (4 pages).

* cited by examiner

POLARIZATION TRACKING SYSTEM FOR FREE-SPACE OPTICAL COMMUNICATION, INCLUDING QUANTUM COMMUNICATION

CROSS REFERENCE TO RELATED APPLICATION

This application claims the benefit of U.S. Provisional Application 61/541,679, filed Sep. 30, 2011, which is incorporated herein by reference.

ACKNOWLEDGMENT OF GOVERNMENT SUPPORT

This invention was made with government support under Contract No. DE-AC52-06NA25396 awarded by the U.S. Department of Energy. The government has certain rights in the invention.

FIELD

The disclosure pertains to methods and apparatus for controlling states of polarization at optical communication and quantum cryptographic receivers and transmitters.

BACKGROUND

In quantum communication, two parties exchange information encoded in quantum states. Typically, the quantum states are specially defined properties of photons such as pairs of polarization states (e.g., 0° and 90°, or 45° and 135°) or circular basis states (e.g., left-handedness and right-handedness). Through the quantum communication ("QC"), the two parties produce a shared random series of bits known only to them, which can then be used as secret keys in subsequent encryption and decryption of messages.

A third party can, in theory, eavesdrop on the QC between the two parties. Such eavesdropping perturbs the QC, however, introducing anomalies that the two intended parties can detect. Using conventional communication, the two parties post-process the results of the QC to remove any partial information acquired by an eavesdropper, and form shared secret keys from the remaining information resulting from the QC.

For example, according to one general approach to QC, a transmitter sets the quantum state of binary information, makes a record of how it set the quantum state, and transmits the information. Table 1 shows an example of quantum states and bases for different polarizations of photons. For the bases and states shown in Table 1, the transmitter selects a basis (rectilinear or diagonal), sets the polarization state for a photon in the selected basis, and records the bit value (0 or 1), the selected sending basis and the time of transmission.

TABLE 1

Example bases and quantum states.

| Basis | 0 | 1 |
|---|---|---|
| Rectilinear (+) | 90° | 0° |
| Diagonal (x) | 45° | 135° (or −45°) |

A receiver receives the binary information, measures the quantum state of the information and makes a record of how it measured the quantum state. The measured state depends on how the receiver performs the measurement (e.g., with measuring basis of rectilinear or diagonal). The transmitter and receiver are expected to record different bit values in some instances because the transmitter and receiver at times set/measure the quantum-state-encoded information in different ways. Thus, after exchanging information in quantum states, the transmitter and receiver compare their records of how the quantum states were set and measured. For this comparison, the transmitter and receiver exchange information over a public channel. Then, the transmitter and receiver produce a shared series of bits (keys) from the encoded information for which quantum states were set and measured in the same way by the transmitter and receiver.

For the bases and states shown in Table 1, for example, the receiver selects a basis (rectilinear or diagonal), measures the polarization state in the selected basis, and records the measured bit value and measuring basis. No possible measuring basis can distinguish all four states, so the receiver essentially guesses either rectilinear or diagonal. If the measuring basis happens to match the sending basis, the receiver should measure the correct bit value. If the measuring basis does not match the sending basis, however, the measured bit value is as likely to be correct as incorrect. For example, if the sending basis is diagonal for the bit value 0 (polarization state of 45°) but the measuring basis is rectilinear, the measured bit values of 0 (90°) and 1 (0°) are equally likely. The transmitter and receiver compare the sending basis and measuring basis for a given photon, and keep the bit value for a photon if the sending basis and measuring basis match.

If an eavesdropper intercepts and measures a photon, the measurement perturbs the quantum state of the photon. The eavesdropper can only guess the original sending basis when it re-encodes and re-transmits the photon to the intended destination. At the time of measurement by the receiver, the eavesdropping is not detected. Instead, for subsets of the bit values for which sending basis and measuring basis are found to match, the transmitter and receiver compare parity values. The parity values should match exactly, if the system is appropriately tuned and free from imperfections in transmission and reception. Eavesdropping introduces noticeable discrepancies in the bit values, which allows the transmitter and receiver to detect the eavesdropping, correct the keys, and establish an upper limit on the eavesdropper's partial information.

An error-free bit string shared by the transmitter and receiver can then be privacy-amplified (e.g., by hashing with a hashing function) to reduce its length. (Or, bits can simply be dropped, but this lacks advantages of privacy amplification.) The final length of the shared bit string can depend on the number of errors detected. Shortening the shared bit string with privacy amplification reduces knowledge an eavesdropper might have to an arbitrarily low level—typically, much less than a single bit.

Unfortunately, practical QC systems such as those using optical systems that track remote receivers exhibit increased errors due to difficulties in establishing appropriate states of polarization (SOPs) at a receiver. Typically, a transmitted state of polarization from a fixed receiver varies or appears to vary at a receiver as the transmitter optical system is adjusted to track a moving receiver. For example, in earth to satellite communication, a ground based transmitter tracks satellite motion, thereby producing changes in SOP at the satellite receiver that are unrelated to the intended QC signal.

SUMMARY

In representative examples, a transmitter (Alice) transmits with four quantum lasers in two linearly polarized conjugate bases along with a polarization tracking or "beacon" optical signal that is also linearly polarized. As Alice's transmitter is rotated to account for transmitter/receiver relative motion, the beacon polarization is used as a fiducial for the quantum channels. The tracking system monitors the angle of polarization of the beacon and rotates a half-wave plate at a receiver input to hold the detected polarization approximately constant. Additional retarders or other polarization dependent optical components such as Fresnel rhombs can be used as well.

In some examples, a quantum communication system includes at least one communication laser configured to transmit quantum communication (QC) optical radiation in orthogonal states of polarization. A beacon source is configured to produce optical radiation at a wavelength different from the communication laser, and a transmission optical system is coupled to direct the combined communication optical radiation and the beacon radiation along a common optical axis. In some examples, the system includes a dual wavelength single mode fiber configured to receive the communication and beacon optical radiation, and direct the combined optical radiation to the transmission optical system.

In other examples, quantum receivers include a receiver optical system configured to receive a combined optical signal that includes quantum communication (QC) optical radiation and beacon optical radiation. A QC optical signal receiver is configured to decode data from the QC optical radiation based on at least one polarization basis, and a tracking optical retarder is situated so as to provide a variable retardation to at least the received QC optical radiation for delivery to the QC signal receiver. A polarization control system controls the variable retardation of the tracking optical retarder so that a state of polarization of at least one element of a polarization basis of the received QC optical radiation corresponds to a state of polarization associated with the QC signal receiver. In representative examples, the tracking optical retarder is a $\lambda/2$ retarder for the QC optical radiation, and the polarization control system is configured to orient an optic axis of the $\lambda/2$ retarder.

Methods comprise combining quantum communication (QC) optical radiation with beacon optical radiation, wherein the beacon optical radiation has a state of polarization corresponding to a basis polarization of the quantum communication optical radiation, and transmitting the combined QC and beacon optical radiation. Typically, the QC and beacon optical radiation are combined so as to propagate along a common axis. In other methods, a combined optical signal including quantum communication (QC) optical radiation and beacon optical radiation is received, and state of polarization of the QC optical radiation is adjusted based on a state of polarization of the received beacon optical radiation.

The foregoing and other features and advantages of the disclosed technology will become more apparent from the following detailed description, which proceeds with reference to the accompanying figures.

DETAILED DESCRIPTION

As used in this application and in the claims, the singular forms "a," "an," and "the" include the plural forms unless the context clearly dictates otherwise. Additionally, the term "includes" means "comprises." Further, the term "coupled" does not exclude the presence of intermediate elements between the coupled items.

The systems, apparatus, and methods described herein should not be construed as limiting in any way. Instead, the present disclosure is directed toward all novel and non-obvious features and aspects of the various disclosed embodiments, alone and in various combinations and sub-combinations with one another. The disclosed systems, methods, and apparatus are not limited to any specific aspect or feature or combinations thereof, nor do the disclosed systems, methods, and apparatus require that any one or more specific advantages be present or problems be solved. Any theories of operation are to facilitate explanation, but the disclosed systems, methods, and apparatus are not limited to such theories of operation.

Although the operations of some of the disclosed methods are described in a particular, sequential order for convenient presentation, it should be understood that this manner of description encompasses rearrangement, unless a particular ordering is required by specific language set forth below. For example, operations described sequentially may in some cases be rearranged or performed concurrently. Moreover, for the sake of simplicity, the attached figures may not show the various ways in which the disclosed systems, methods, and apparatus can be used in conjunction with other systems, methods, and apparatus. Additionally, the description sometimes uses terms like "produce" and "provide" to describe the disclosed methods. These terms are high-level abstractions of the actual operations that are performed. The actual operations that correspond to these terms will vary depending on the particular implementation and are readily discernible by one of ordinary skill in the art.

For convenience in the following description, selected linear states of polarization (SOPs) are referred to as rectilinear up, rectilinear down, diagonal, and anti-diagonal with respect to an xyz coordinate system in which a direction of propagation of an optical beam is along a z-axis, rectilinear up and down SOPs are linear orthogonal polarizations that are along a +y-axis and a +x-axis, respectively. For convenience these can be referred to as "H" and "V" polarizations, respectively. Diagonal polarization ("D") and an anti-diagonal polarization ("A") are orthogonal linear polarizations that are oriented along an axis rotated 45 degrees from the +x-axis towards the +y-axis, and oriented along an axis rotated 45 degrees from the +x-axis towards the −y-axis, respectively. Polarization pairs H, V and D, A form respective polarization bases referred to for convenience as a rectilinear basis and a diagonal basis. The rectilinear and diagonal bases are examples of so-called "conjugate bases" in which the measurement of a SOP in a first basis randomizes measurement in a second basis. It will be apparent that the SOPs and polarization bases described above are representative SOPs and bases only, and other SOPs and bases using other linear polarizations, circular polarizations, or elliptical polarizations can be selected. Any particular coordinate system is selected for convenient description, and other coordinates can be used. For purposes of illustration, a vertical polarization is a polarization perpendicular to the plane of a drawing, and a horizontal polarization is a polarization in the plane of the drawings.

In the following description, axes and orientations of wave plates (retardation plates or retarders) or other polarization dependent optical components can be described with respect to an xyz coordinate system such as described above. In addition, for convenience, a variable retarder as used herein refers to a device that provides either a varying phase difference between different SOPs, or whose axis is movable (typically rotatable) so as to apply a fixed retardance to varying portions of an input SOP, based on input SOP polarization with respect to a variable optical axis.

Propagating optical radiation as used herein refers to electromagnetic radiation in a wavelength range of between about 100 nm and 100 µm. Such propagating radiation is referred to herein as an optical input or an optical output, optical signals or optical radiation.

Representative QC System Components

Figure 1:
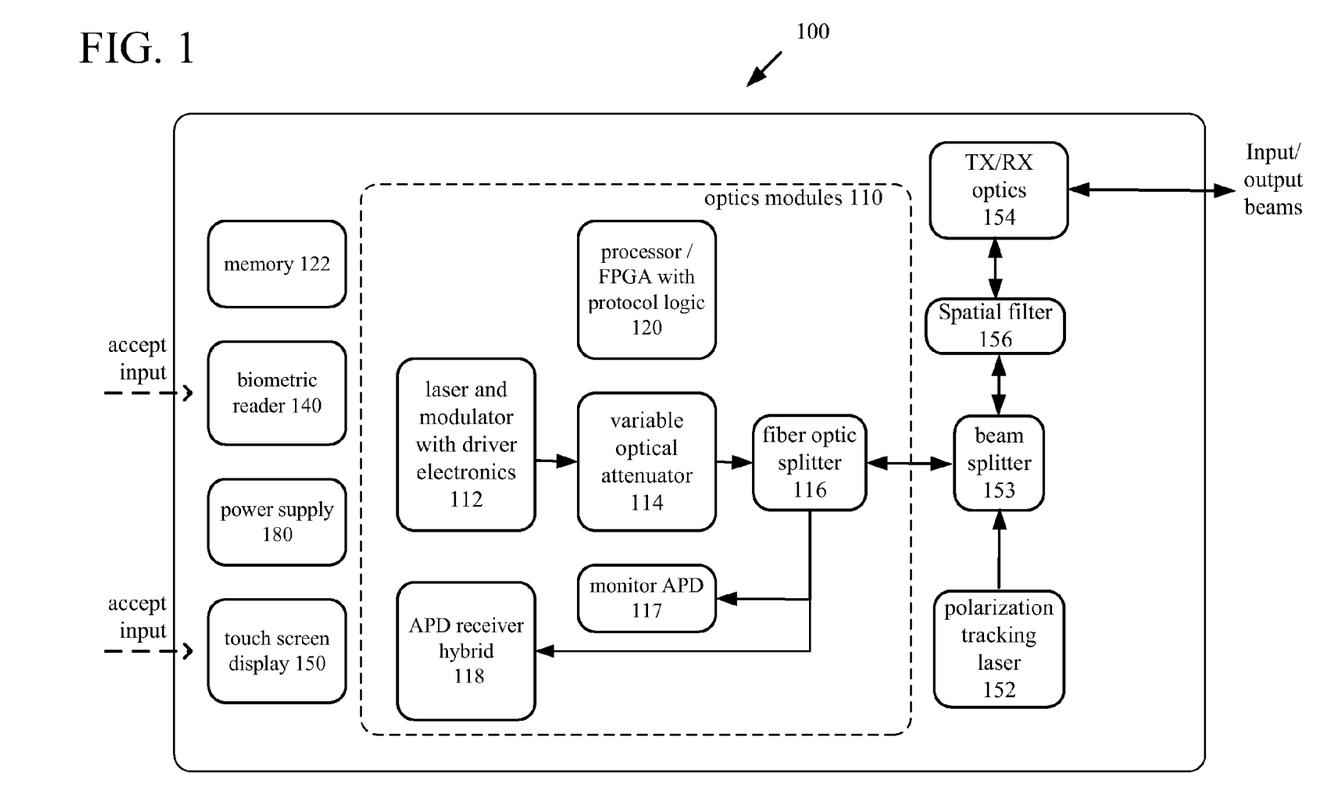
FIG. 1 is a block diagram of a generalized quantum communication (QC) transceiver.

As shown in FIG. 1, a representative QC transmitter/receiver includes a plurality of optics modules or optical elements 110 adapted for free space optical communication. The optics modules 110 transmit binary information for which modulation of quantum state is measured (by a QC receiver). The optics modules 110 can also provide a network transceiver adapted to transmit and receive information in a public channel over the optical fiber, transmitting and receiving binary information for which modulation of quantum state is not measured by a QC receiver.

Among the optics modules 110, the laser and modulator with driver electronics 112 include a laser adapted to generate photons for QC transmission and a modulator adapted to modulate quantum state (e.g., polarization state) of output of the laser. The modulator is optically coupled to the laser and can be implemented, for example, with a lithium niobate modulator that modulates polarization state between 0°, 45°, 90° and −45°. The system can also be configured to track received polarization so as to maintain the polarization state from the QC transmitter to QC receiver. Alternatively, the modulator is implemented with another kind of integrated-optic or bulk-crystal modulator. The choice of modulator is implementation-specific and can depend, for example, on suitability of the modulator for the specific wavelength of light from the laser, operating frequency of the modulator and/or state purity for the polarization states produced.

The variable optical attenuator 114 is optically coupled to the laser. The attenuator is adapted to reduce photons per pulse of the laser, which improves security of the QC by foiling eavesdropping attempts that intercept extra photons. The monitor avalanche photodiode ("APD") 117 is split from other modules by the fiber optic splitter 116 and adapted to measure number of photons per pulse from the laser used for QC. For example, the APD 117 is implemented with one or more InGaAs photon detectors for quantum signals at 1550 nm wavelength, or Si APD single-photon detectors for quantum signals at 800 nm wavelength. The APD 117 provides feedback used to control the laser and attenuator 114 for QC. Another detector (not shown) receives information as a conventional fiber optic receiver for non-quantum communication.

The processor/field-programmable gate array ("FPGA") with protocol logic 120 controls different operations as part of QC. In particular, the processor/FPGA 120, which is electrically coupled to the module 112, is configured to coordinate operations of the laser and the modulator through driver electronics included with the laser and modulator 112. A random number generator generates a series of random bits for high-quality random numbers. With high-fidelity polarization control, the processor/FPGA 120 controls the polarization of photons with the modulator to encode random bits as different polarization states according to a QC protocol. The processor/FPGA 120 monitors the number of photons per pulse (measured with the APD 117) for the QC. Through control of the laser and variable optical attenuator 114, the processor/FPGA 120 can selectively reduce photons per pulse of the laser to an average level of a single photon per pulse.

The processor/FPGA 120 thus controls the timing and pattern of the single-photon pulses produced by the laser for QC. The processor/FPGA 120 also controls the timing and pulses of bright pulses produced for synchronization, non-quantum communication and/or other purposes.

For other aspects of the QC protocol, the processor/FPGA 120 controls operations associated with recording the quantum state and sending basis per pulse for the QC, transmitting the recorded sending bases, to, and otherwise processing conventional QC protocol elements. The processor/FPGA 120 can coordinate operations for privacy amplification and decoy states to further improve security. Privacy amplification reduces the length of a shared bit string (e.g., by hashing with a hash function) to reduce partial information that an eavesdropper might have gained. The final length of the string can be set depending on the number of errors detected. For imperfect single-photon sources such as weak laser pulses, decoy states of different average photon numbers (brightness) can be transmitted so that the error rate and number of single photons in a bit string can be determined and used to regulate the degree of privacy amplification.

The memory 122 stores one or more keys. For example, the memory 122 stores quantum keys. In some implementations, the memory 122 is secure memory and keys are stored in encrypted form. The memory 122 can be fabricated along with the integrated optics modules 110 or separately placed.

The biometric reader 140 is a scanner or other module adapted to accept biometric indicia of a user. For example, the biometric reader 140 is a fingerprint scanner. The processor/FPGA 120 can include logic for encrypting the biometric indicia with a key stored in the secure memory 122. Or, one or more other encryption modules (not shown) can provide such encryption functionality.

The touch screen display 150 accepts user input (e.g., to a numeric keypad) that can be encrypted along with the biometric indicia as part of user authentication. The touch screen display 150 also displays information to the user (e.g., a count of quantum keys in memory 122, a prompt to contact a trusted authority to make quantum keys, a prompt to initiate secure communication with another, or a prompt for another function) and accepts user input.

Outside of the integrated optics modules 110, most of the functional modules can be implemented with standard components for portable or non-portable devices. Among the integrated optics modules 110, many of the modules (e.g., attenuator 114), monitor APD 117, splitter 116 and APD discriminator hybrid 118 can be implemented with standard components for fiber optic or bulk optical communication. Other functional modules (e.g., FPGA) can be implemented with control components that have been used with conventional QC transmitters to: (1) produce specific polarization states with a fiber-optic modulator; (2) regulate production of precisely timed QC and bright pulses in a known pattern disciplined with GPS 190 and an oscillator or atomic clock, for the trusted authority to track timing and time variations when performing QC; (3) monitor average photon number per pulse using the timing system and APD 117; (4) control APD bias, gating, and discriminator 118 electronics; (5) process conventional QC protocol control elements, e.g., to track, correct and exchange polarization state information.

The system 100 also includes a polarization tracking laser 152 (or beacon) that is coupled to QC optical signals with a beam splitter 153. As shown in FIG. 1, a spatial filter 156 can be provided to spatially filter optical pulses that are delivered to or received from transmit/receive optics 154. The beacon laser 152 can be modulated with a selected modulation pattern so as to permit identification of the beacon beam and to discriminate against other radiation sources. In some examples, a pseudo-random temporal pattern determined by a secret seed value available at a receiver is used. Such a pattern can prevent denial of service attacks by malicious third parties by attempting to disrupt receiver link acquisition with light sources at the beacon wavelength.

Figure 2:
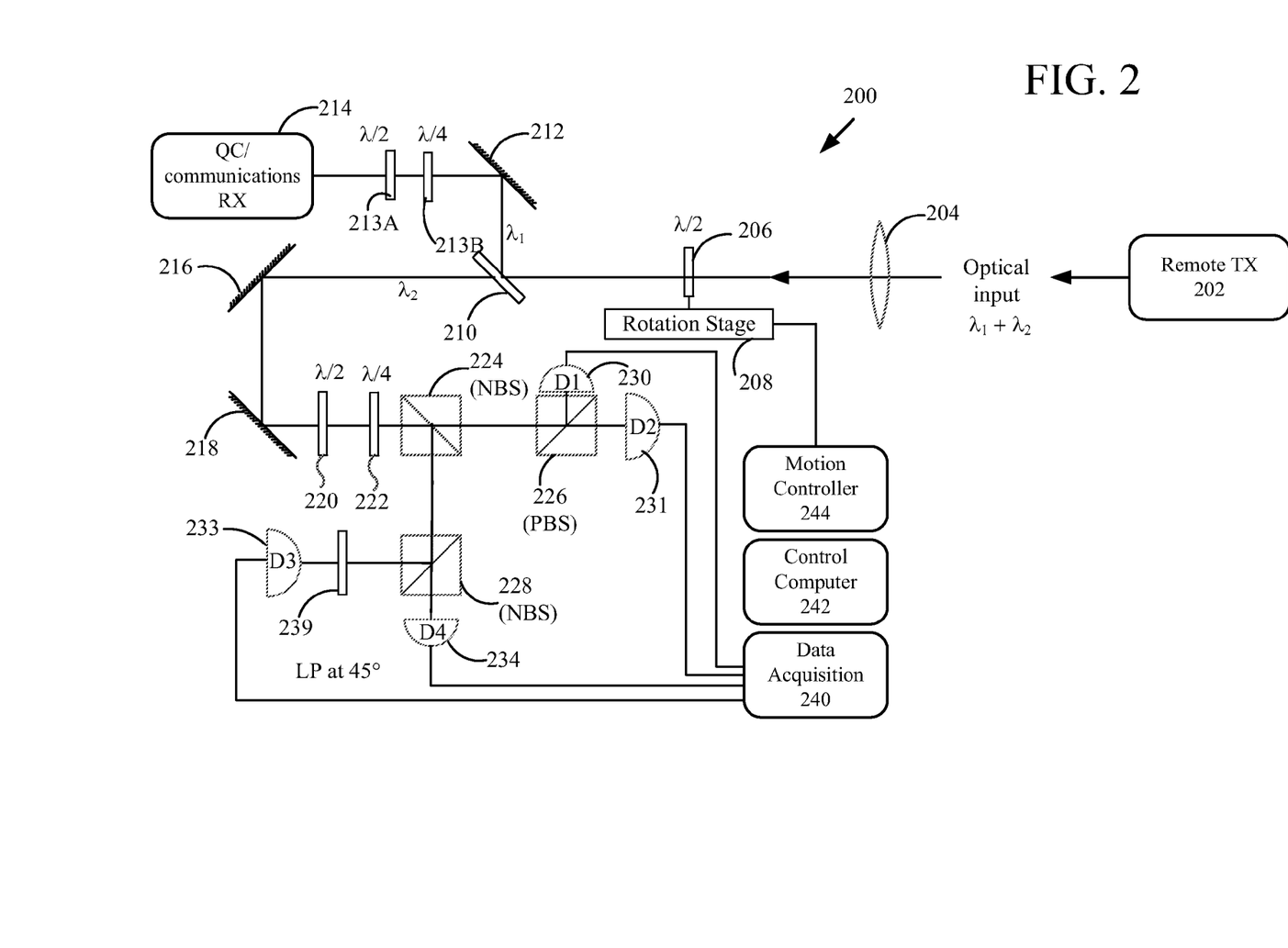
FIG. 2 is a block diagram of an example implementation of a polarization tracking receiver.

A representative QC system receiver 200 that provides polarization tracking is illustrated in FIG. 2. In this example, bulk rotation of a polarization received from remote transmitter 202 is detected or predicted so that polarization changes of the received optical input can be eliminated or at least partially compensated. As noted above, if rotation-induced polarization changes were left uncompensated, a receiver would interpret transmitter bulk rotation as a rotation in polarization states, and systematically send photons to the wrong detectors. The resulting increase in bit error rate would be unacceptable.

As shown in FIG. 2, the receiver 200 is configured to receive an optical input that includes optical radiation at two or more wavelengths or in two or more wavelength bands, indicated in FIGS. 2 as $\lambda_1$ and $\lambda_2$. Preferably, these wavelengths or wavelengths bands are non-overlapping and are sufficiently separated so that conventional dichroic beam splitters or other optical beam splitters or filters can direct radiation at each wavelength or wavelength band to corresponding optical detection systems. In the example of FIG. 2, optical radiation at the wavelength $\lambda_1$ can be referred to as a polarization tracking or "beacon" input and the optical radiation at the wavelength $\lambda_2$ can be referred to as a quantum communication (QC) input. As discussed below, the beacon input is provided for polarization compensation of the QC input, but the beacon input can also be used for data communications or other purposes as well.

The combined beacon and QC optical input is typically focused, collimated, or otherwise shaped by receiver optics 204 and then directed to a polarization compensation retardation plate 206 that is configured to alter the SOPs of the beacon and QC inputs. In convenient examples, the retardation plate 206 is a dual wavelength half-wave retarder that provides half wave retardation for both the beacon and QC inputs. Such a dual wavelength retarder can be particularly convenient based on the selection of beacon and QC input wavelengths. For example, a beacon wavelength of about 1550 nm and a QC wavelength of about 775 nm, or other beacon and QC wavelength selections in which a ratio of $\lambda_1$ to $\lambda_2$ or $\lambda_2$ to $\lambda_1$ is about ½ are convenient. It will be appreciated that opto-electronic and optical components for use at wavelengths of 775 nm and 1550 nm are readily commercially available, but other wavelengths can also be used. The retarder 206 is coupled to a rotational stage 208 such as stepper motor operated stage so that an axis of the retarder 206 with respect to the combined input can be selected and varied.

A non-polarizing dichroic beam splitter (BS) 210 receives the combined input and directs the QC input via a mirror 212 to a QC receiver 214. In some cases, retarders 213A, 213B are provided to correct or compensate polarization changes at mirrors, beamsplitters, or other nominally polarization independent components. The QC receiver 214 is typically configured for quantum communication based on SOP of input photons, but can also be configured for conventional optical communication based on direct, heterodyne, or homodyne optical detection in addition to or instead of quantum communication. The BS 210 transmits the beacon input to mirrors 216, 218 and tracking retarders 220, 222. As shown in FIG. 2, the retarders 220, 222 are $\lambda/2$ and $\lambda/4$ retarders, respectively, at the wavelength of the beacon input. The beacon input is then directed to a non-polarizing beam splitter 224 that couples first and second portions of the beacon input to a polarizing beam splitter (PBS) 226 and a non-polarizing beam splitter (NBS) 228. The PBS 226 directs orthogonally linear polarized components of the first portion of the beacon input to optical detectors 230, 231, respectively. For convenient description, the detectors 230, 231 are also referred to as D1, D2, respectively. The NBS 228 directs a portion of the beacon input to a linear polarizer 239 oriented with an optic axis at 45 degrees with respect to an axis of the PBS 226 and to a detector 233 (D3). The NBS 228 also directs a portion of the beacon input to a detector 234 (D4).

The detectors 230, 231, 233, 234 can be photodiodes or other types of detectors. For a beacon wavelength of about 1550 nm, germanium photodiodes can be used, but InGaAs detectors can be used as well. Other detectors may be appropriate for other beacon wavelengths. For example, for beacon wavelengths in a visible wavelength range, silicon photodetectors are generally suitable. The detectors 230, 231, 233, 234 are electrically coupled to a data acquisition system 240 that can include one or more amplifiers such as transimpedance amplifiers or logarithmic amplifiers configured to amplify or buffer photodetector input signal currents or voltages, and analog to digital convertors configured to digitize amplified, unamplified, or buffered detector electrical signals. The detectors 230, 231, 233, 234 need not be of the same type or construction, although typically detectors 230, 231, 233 are generally substantially the same and are used for polarization tracking, while the detector 234 is generally configured to provide a higher speed signal that can be used to determine data timing. For polarization tracking, relatively large area germanium photodetectors can be used for the detectors 230, 231, 233 and a relatively small area photodetector can be used as the detector 234 to provide high speed response in order to provide a timing reference in the beacon for quantum or other communications, or to generally provide non-quantum communication. The beacon input can be modulated to provide data timing, to permit synchronous detection of the beacon input, and the detectors 230, 231, 233 used to estimate polarization errors and their respective amplifiers and associated electronics can be coupled so that such modulations do not contribute to polarization error signals. This can be conveniently accomplished by filtering the photodetector signals or configuring the photodetectors 230, 231, 233 to reduce signals at the modulation frequencies. In some examples, the beacon input is pulsed, and the detector 234 (D4) is configured so as to determine that the beacon input has been activated. In the configuration of FIG. 2, the detector 233 is configured so as to receive a portion of the beacon input regardless of beacon polarization. The data acquisition system 240 can also include bias electronics for the detectors 230, 231, 233, 234 and control of detector coolers or other detector systems as may be convenient.

A control computer 242 is coupled to the data acquisition system 240 and generally receives digital data corresponding to electrical signals from the detectors 230, 231, 233, 234. A motion controller 244 is coupled to the control computer 242 and is configured to receive control inputs from the control computer 242 that are based on one or more of the detector signals. Based on the control inputs, the motion controller 244 provides a corresponding rotational control electrical signal to the rotation state 208 so that the axis of the retarder 206 can be oriented so as to compensate polarization changes in the received QC input. The data acquisition system 240, the control computer 242, and the motion controller 244 are shown in FIG. 2 as separate systems, but in other examples can be combined in a single control system based on a dedicated or special purpose processor.

Polarization tracking can be accomplished with the system of FIG. 2 as follows. A polarization error is estimated at the control computer 242 based on signals from the detectors D1, D2, D3, and a suitable rotation of the retarder 206 is determined. A corresponding rotational signal or command is issued so as to rotate the retarder 206. Polarization error can be repeatedly estimated, or errors can be calculated at random, periodic, or other intervals. For example, the beacon input can be pulsed, and polarization errors estimated and compensated in response. As the beacon optical input is at a wavelength distinct from the QC optical input, substantially continuous error estimation can be provided, if desired.

For a linearly polarized beacon, Stokes parameters or Jones matrices can be used to estimate a polarization angle $\theta$ with respect to a predetermined orientation such as an H, V, D, or A orientation. With this angle determined, the dual wavelength $\lambda/2$ retarder is rotated by $\theta/2$ in the appropriate direction to align the beacon (and the QC signals) with the preferred polarization bases. In some examples, an incident angle of polarization can be estimated using signals from detectors D1-D3 as an arcsine of a ratio of a detector signal from D1 or D2 to a sum of D1 and D2 detector signals as well as an arcsine of detector signal D3 referenced to a stored calibration value. In some situations, received beacon input power exhibits surges and fades due to, for example, atmospheric turbulence, and it may be preferable to determine input polarization without being subject to variations in the D3 detector signal that are associated with such beacon input power variations. To provide a suitable reference, the detector D4 can be made similar the detector D3 so as to provide a reference for power and power surges and fades distinguished from polarization changes. In this case, the beam splitter 228 would be a PBS and have an associated half-wave retarder or half-wave and quarter wave retarders to change to the conjugate basis and correct any polarization errors introduced by the NBS 224.

In an alternative embodiment, polarization tracking can be based on an error magnitude associated with a magnitude of the signal from detector D3 and a sign of the error estimated by comparison with the detector signals from detectors D1 and D2. The error signal is processed by the control computer to produce a rotation signal for the rotational stage 208, and the rotation angle of the tracking retarder 206 adjusted to reduce or minimize the signal produced by the detector D3 so that the polarization of the optical input is controlled. Changes in the optical input power can reduce the sensitivity with which polarization changes are detected, and may result is some slight angular oscillation of the tracking retarder 208, but can work satisfactorily.

Representative Methods

Figure 3:
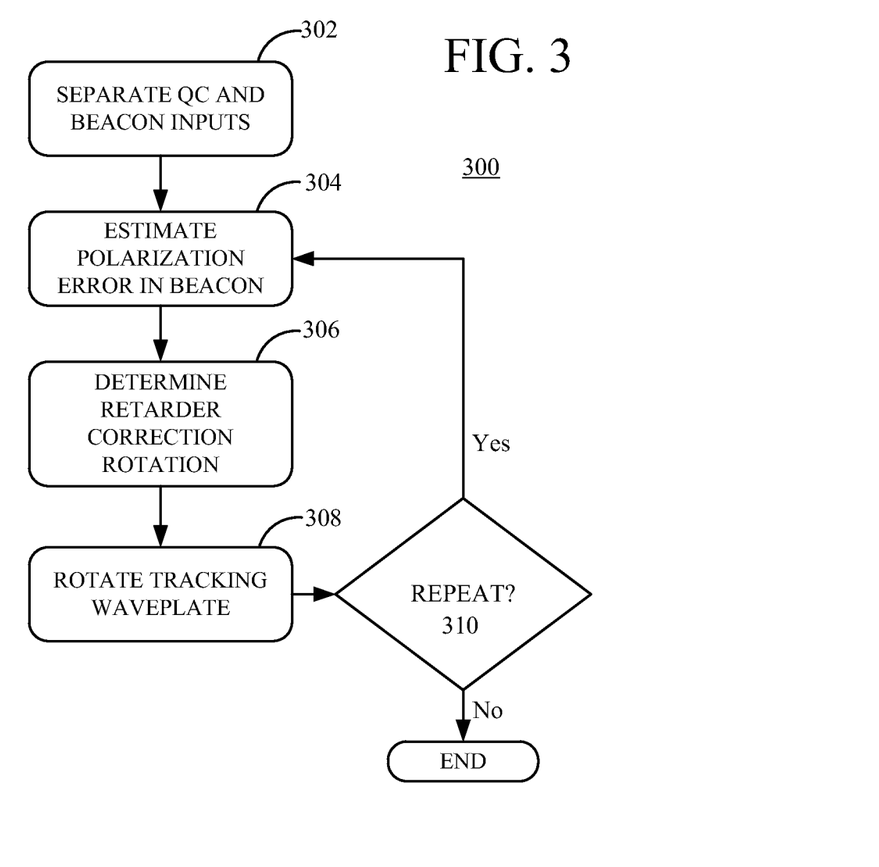
FIG. 3 is a block diagram of a representative polarization tracking and compensation method.

A representative method 300 of polarization tracking is illustrated in FIG. 3. At 302, separate QC and beacon optical inputs are received. At 304, a state of polarization (SOP) of the beacon is estimated with respect to a predetermined (intended) SOP to produce an error signal. At 306, suitable rotation is determined for a tracking retarder so as to rotate the SOP of the QC optical input into the predetermined SOP. At 308, the tracking retarder is rotated. At 310, requests for additional or continual polarization tracking are received, and if additional correction is requested, a polarization error estimated again at 304, and the tracking process continues as above.

In the examples above, specific configurations of $\lambda/2$ and $\lambda/4$ retarders are used, but in other examples, one or more retarders of different retardance can be used. Typically, linear and/or diagonal SOPs are intended to be provided to a QC receiver, but other polarization bases can be used. While a tracking retarder can be inserted in a combined optical input (QC and beacon inputs), the tracking retarder can be situated to receive only the QC optical input. In this case, polarization adjustments to the QC optical input can be determined based on the beacon input, but adjustment of the tracking retarder does not alter the SOP received by the tracking system. However, by positioning the tracking retarder in a combined optical input, suitable adjustment of the tracking retarder can be confirmed.

Representative Transmitter

Figure 4:
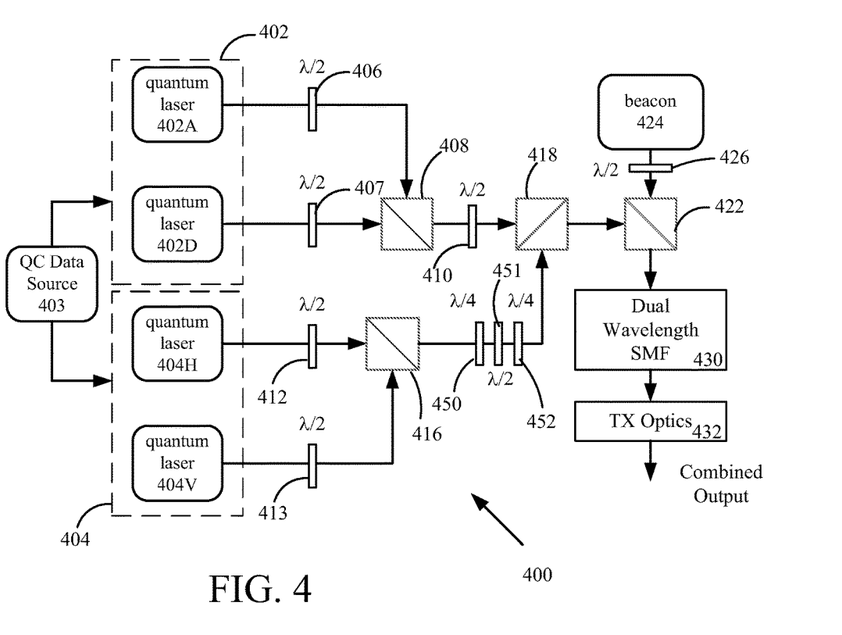
FIG. 4 is a block diagram of an example implementation of a QC transmitter.

With reference to FIG. 4, a representative QC transmitter 400 includes laser pairs 402, 404 configured to transmit in a diagonal basis and a rectilinear basis, respectively, based on QC data provided by a QC data source 403. In typical practical implementations, a single laser is used along with a polarization modulator that can be used to select an output state of polarization in the selected bases. The diagonal laser pair 402 includes a laser 402D situated to produce a diagonal polarization and a laser 402A situated to produce an anti-diagonal polarization. The orientation of the SOP of each of these lasers is adjusted with respective $\lambda/2$ retarders 406, 407 so that the laser outputs can be combined with a polarizing beam splitter (PBS) 408 and the output SOP adjusted to be in the diagonal basis with a $\lambda/2$ retarder 410. In some examples, a series of retarders such as retarders 450, 451, 452 can be used, particularly if SOPs are not eigenpolarizations of the PBS 410. Similarly, the rectilinear laser pair 404 includes a laser 404H situated to produce a horizontal polarization and a laser 404V situated to produce a vertical polarization. The orientation of the SOP of each of these lasers is adjusted with respective $\lambda/2$ retarders 412, 413 and the laser outputs combined with a polarizing beam splitter 416. Retarders 450, 451, 452 are provided to correct the SOPs of the output from the PBS 416. A non-polarizing beam splitter 418 receives the diagonal basis and the rectilinear basis and directs the combined SOP bases to a dichroic beam splitter 422. A beacon laser 424 is situated to direct a beacon optical signal to the dichroic beam splitter 422 via a $\lambda/2$ retarder 426 that can be oriented to so that a particular beacon SOP, typically a beacon SOP that corresponds to a selected one of the SOPs of the rectilinear and diagonal bases, is combined with the combined quantum laser outputs by the beam splitter 422. In some examples, a series of retarders similar to retarders 450, 451, 452 are used instead. The combined beacon/quantum laser output can be coupled into a dual wavelength single mode optical fiber (SMF) 430 such as a photonic crystal optical fiber, and then transmitted with transmitter optics 432, typically one or more lenses or mirrors. Preferably, the dual wavelength SMF 430 provides concentric cores for both the quantum laser outputs and the beacon laser output so that the combined outputs overlap as propagated to a receiver. Such overlap is not required, but substantially simplifies design. In one embodiment, an endlessly single mode photonic crystal fiber having a 1550 nm mode field diameter of 6.4 µm, a core diameter of 12.0 µm, a pitch of 8 µm between adjacent holes, a normalized hole diameter of 8.0 µm, and a holey region of diameter 60 µm is used.

For polarization trackers based on angular adjustment of a $\lambda/2$ retarder, the quantum channels and the beacon are preferably linearly polarized as incident to a dual-wavelength $\lambda/2$ retarder. Such a $\lambda/2$ retarder can rotate linear SOPs so as to maintain their respective (conjugate) orientations. Thus, if a $\lambda/2$ retarder is used to compensate changes in SOPs, the input to a QC receiver (both quantum channels and beacon) are preferably linearly polarized. The transmitter 400 can be calibrated using a linear polarizer to adjust each of the $\lambda/2$ retarders so that the SOPs are aligned along suitable axes, and the SOPs of each of the bases remain substantially orthogonal. In addition, it may be preferable to configure transmitter SOPs so that linear SOPs are provided to the tracking $\lambda/2$ retarder. Thus, it may be convenient to insert a polarizer into a receiver at an input side of the tracking retarder, and adjust the SOPs of the quantum lasers using the polarizer. After adjustment, the polarizer is removed. A corresponding receiver can be adjusted using retarders so that each of the transmitted quantum SOPs is directed to a corresponding detector.

In some examples, changes in SOPs at a receiver can be determined based on receiver/transmitter positions or relative movements. In these examples, a polarization controller using a half-wave retarder on a rotational stage can be used to correct SOPs at a receiver based on characterizations of the relative movements. A beacon signal can be used to confirm adjustment or to provide corrections to retarder orientation, but is not required.

In view of the many possible embodiments to which the principles of the disclosed technology may be applied, it should be recognized that the illustrated embodiments are only preferred examples and should not be taken as limiting the scope of the disclosure. We claim as our invention all that comes within the scope and spirit of the appended claims.

We claim:

1. A quantum transmitter, comprising:
  a communication laser configured to transmit communication optical radiation at a communication optical wavelength in a polarization basis;
  a beacon source configured to produce optical radiation at a beacon optical wavelength different from the communication optical wavelength and in a state of polarization corresponding to a state of polarization in the polarization basis to enable a receiver to correct for polarization errors caused by rotation of the quantum transmitter relative to the receiver;
  a dichroic beam splitter configured to combine the communication optical radiation and the beacon optical radiation;
  a transmission optical system configured to direct the combined communication optical radiation and the beacon optical radiation to the receiver along a common optical axis in free space using a dual wavelength, single mode, photonic crystal fiber that provides concentric cores for both the communication optical radiation and the beacon optical radiation, such that light at both the communication optical wavelength and the beacon optical wavelength are both able to propagate along the fiber in only one mode; and
  a processing circuit configured to generate a secret sequence of bits that is shared with a quantum receiver based on the communication optical radiation for one or more cryptographic operations.

2. The transmitter of claim 1, further comprising:
  a beacon modulator configured to provide an electrical modulation signal to the beacon source.

3. The transmitter of claim 2, wherein the beacon modulator is configured to apply a predetermined modulation pattern to the beacon source.

4. The transmitter of claim 3, wherein the predetermined modulation pattern is a pseudo-random pattern determined by a seed value.

5. The transmitter of claim 2, wherein the electrical signal supplied by the beacon modulator is at least one of a data signal associated with data communication or a timing signal associated with a modulation of the communication optical radiation.

6. The transmitter of claim 1, wherein the communication laser is configured to provide communication optical radiation in two conjugate polarization bases.

7. The transmitter of claim 1, further comprising a beacon laser controller configured to activate and de-activate the beacon source.

8. A quantum receiver, comprising:
  a receiver optical system configured to receive a combined optical signal from a transmitter via free space that includes quantum communication (QC) optical radiation at a QC optical wavelength and beacon optical radiation at a beacon optical wavelength, wherein the QC optical radiation and the beacon optical radiation have been transmitted by a transmitter using a dual wavelength, single mode, photonic crystal fiber that provides concentric cores for both the QC optical radiation and the beacon optical radiation, such that light at both the QC optical wavelength and the beacon optical wavelength are both able to propagate along the fiber in only one mode;
  a dichroic beam splitter configured to separate the QC optical radiation from the beacon optical radiation;
  a QC receiver configured to decode data from the received QC optical radiation based on a polarization basis;
  a tracking optical retarder situated so as to provide a variable retardation to the received QC optical radiation for delivery to the QC receiver;
  a polarization control system configured to continuously estimate, based on the beacon optical radiation, a polarization error caused by rotation of the transmitter relative to the receiver, and control, based on the estimated polarization error, the variable retardation of the tracking optical retarder to compensate for the polarization error; and
  a processing circuit configured to generate a secret sequence of bits that is shared with the transmitter based on the QC optical radiation for one or more cryptographic operations.

9. The quantum receiver of claim 8, wherein the tracking optical retarder is a $\lambda/2$ retarder for the QC optical radiation, and the polarization control system is configured to provide the variable retardation by rotating the $\lambda/2$ retarder.

10. The quantum receiver of claim 8, wherein the tracking optical retarder is a dual wavelength $\lambda/2$ retarder situated to provide a $\lambda/2$ retardation to the QC optical radiation and the beacon optical radiation, and the polarization control system is configured to rotate the dual wavelength λ/2 retarder to provide the variable retardation.

11. The quantum receiver of claim 8, wherein the polarization control system includes a polarization analysis system configured to detect portions of the received beacon optical radiation having states of polarization corresponding to two conjugate bases.

12. The quantum receiver of claim 11, wherein the two conjugate bases are a rectilinear basis and a diagonal basis, and the polarization control system is configured to detect portions of the received beacon optical radiation in at least one state of polarization of each of the conjugate bases.

13. The quantum receiver of claim 12, wherein the polarization control system is configured to detect portions of the received beacon optical radiation in at least three of the polarization states defined by the conjugate bases.

14. The quantum receiver of claim 8, wherein the tracking optical retarder is a dual wavelength λ/2 retarder situated so as to receive the combined QC and beacon optical radiation, and the polarization control system is operative to adjust the orientation of the tracking optical retarder so that the beacon optical radiation has a polarization state corresponding to a state of polarization of a QC polarization basis.

15. The quantum receiver of claim 8, further comprising a beacon receiver configured to identify the beacon optical radiation based on a predetermined modulation scheme.

16. The quantum receiver of claim 15, wherein the predetermined modulation scheme is based on at least one of a data signal associated with data communication, a timing signal associated with a modulation of the QC optical radiation, or a pseudo-random modulation defined by a seed value.

17. The quantum receiver of claim 8, wherein the polarization control system is configured to estimate the polarization error using at least three optical detectors.

18. The quantum receiver of claim 17, wherein the at least three optical detectors are oriented with optic axes at 45 degrees relative to each other.

19. A method, comprising:
combining, at a quantum transmitter, quantum communication (QC) optical radiation at a communication optical wavelength with beacon optical radiation at a beacon optical wavelength different from the communication optical wavelength using a dichroic beam splitter, wherein the beacon optical radiation has a state of polarization corresponding to a basis polarization of the quantum communication optical radiation;
transmitting the combined QC and beacon optical radiation through free space, so as to enable a receiver to correct for polarization errors caused by rotation of the quantum transmitter relative to the receiver, using a dual wavelength, single mode, photonic crystal fiber that provides concentric cores for both the communication optical radiation and the beacon optical radiation, such that light at both the communication optical wavelength and the beacon optical wavelength are both able to propagate along the fiber in only one mode; and
generating a secret sequence of bits that is shared with a quantum receiver based on the QC optical radiation for one or more cryptographic operations.

20. The method of claim 19, wherein the QC and beacon optical radiation are combined so as to propagate along a common axis.

21. The method of claim 20, wherein a ratio of wavelengths associated with the QC optical radiation and the beacon optical radiation is substantially equal to 2 or ½.

22. A method, comprising:
receiving at a receiver a combined optical signal comprising quantum communication (QC) optical radiation at a QC optical wavelength and beacon optical radiation at a beacon optical wavelength from a transmitter via free space, wherein the transmitter transmitted the QC optical radiation and the beacon optical radiation using a dual wavelength, single mode, photonic crystal fiber that provides concentric cores for both the QC optical radiation and the beacon optical radiation, such that light at both the QC optical wavelength and the beacon optical wavelength are both able to propagate along the fiber in only one mode;
separating, using a dichroic beam splitter, the QC optical radiation from the beacon optical radiation;
continuously estimating a polarization error caused by rotation of the transmitter relative to the receiver based on the beacon optical radiation;
adjusting a state of polarization of the QC optical radiation to compensate for the polarization error; and
generating a secret sequence of bits that is shared with the transmitter based on the QC optical radiation for one or more cryptographic operations.

23. The method of claim 22, wherein the state of polarization of the received QC optical radiation is adjusted by rotating a λ/2 retarder.

24. The method of claim 23, wherein the state of polarization of the received QC optical radiation and the beacon optical radiation are adjusted by rotating a dual wavelength λ/2 retarder, wherein the beacon optical radiation has a state of polarization corresponding to a basis polarization of the quantum communication optical radiation.

25. The method of claim 22, wherein the polarization error is continuously estimated using at least three optical detectors.

26. The method of claim 25, wherein the at least three optical detectors are oriented with optic axes at 45 degrees relative to each other.

* * * * *